| (12) | United States Patent | (10) Patent No.: | US 7,618,534 B2 |
|---|---|---|---|
| | Mihlbauer et al. | (45) Date of Patent: | Nov. 17, 2009 |

(54) AQUARIUM FILTER

(75) Inventors: Brad L. Mihlbauer, Mukwonago, WI (US); Christopher L. Hawker, Santa Cruz, CA (US); David R. Troop, II, Kenosha, WI (US); Lonnie Austin Ready, West Columbia, SC (US); Giacomo Guoli, Milan (IT); Fabio Bellia, Trebaseleghe (IT)

(73) Assignee: Newa Tecno Industria s.r.l. (IT)

( * ) Notice: Subject to any disclaimer, the term of this patent is extended or adjusted under 35 U.S.C. 154(b) by 134 days.

(21) Appl. No.: 11/696,767

(22) Filed: Apr. 5, 2007

(65) Prior Publication Data

US 2007/0251867 A1 Nov. 1, 2007

Related U.S. Application Data

(60) Provisional application No. 60/791,830, filed on Apr. 13, 2006.

(30) Foreign Application Priority Data

Oct. 5, 2006 (IT) .......................... PD2006A0367
Mar. 8, 2007 (EP) ................................ 70103798

(51) Int. Cl.
*A01K 63/04* (2006.01)
(52) U.S. Cl. ............... 210/167.27; 210/416.2; 210/167.22; 119/260
(58) Field of Classification Search ........... 210/167.21, 210/167.22, 167.27, 416.1, 416.2; 119/259, 119/260
See application file for complete search history.

(56) References Cited

U.S. PATENT DOCUMENTS

| 2,275,428 A | 3/1942 | Haldeman |
|---|---|---|
| 2,665,250 A | 1/1954 | Willinger et al. |
| 3,511,376 A | 5/1970 | Sesholtz |
| 3,540,591 A | 11/1970 | Yamazaki |
| 3,566,840 A | 3/1971 | Willinger |
| 3,635,344 A * | 1/1972 | Lovitz ................... 210/167.27 |
| 3,669,297 A | 6/1972 | Willinger |
| 3,717,253 A | 2/1973 | Lovitz |
| 3,738,494 A | 6/1973 | Wilinger et al. |
| 4,093,547 A | 6/1978 | Sherman et al. |
| 4,345,997 A | 8/1982 | McConnell, Jr. |
| 4,735,715 A | 4/1988 | Willinger |

(Continued)

FOREIGN PATENT DOCUMENTS

GB 2 248 558 A 4/1992

(Continued)

OTHER PUBLICATIONS

*Eclipse Aquarium Systems*, Owner's Manual, System 3, System Six, System Twelve, Marineland Aquarium Products, Oct. 2000.

(Continued)

*Primary Examiner*—Fred Prince
(74) *Attorney, Agent, or Firm*—Andrus, Sceales, Starke & Sawall, LLP

(57) ABSTRACT

An aquarium filter assembly is mounted to an aquarium tank and defines a water flow path therethrough from upstream to downstream from an inlet to an outlet. A replaceable filter element is mounted in a filter chamber.

16 Claims, 7 Drawing Sheets

U.S. PATENT DOCUMENTS

| | | |
|---|---|---|
| 4,761,227 A | 8/1988 | Willinger et al. |
| 4,824,727 A | 4/1989 | Balian et al. |
| 4,842,727 A | 6/1989 | Willinger et al. |
| 4,880,549 A | 11/1989 | Willinger et al. |
| 4,997,559 A | 3/1991 | Ellis et al. |
| 5,053,125 A | 10/1991 | Willinger et al. |
| 5,160,607 A | 11/1992 | Thiemer et al. |
| 5,176,824 A | 1/1993 | Willinger et al. |
| 5,228,986 A | 7/1993 | Ellis et al. |
| 5,266,190 A * | 11/1993 | Tominaga ............ 210/167.25 |
| D353,649 S | 12/1994 | Willinger et al. |
| 5,397,463 A | 3/1995 | Woltmann |
| 5,423,978 A | 6/1995 | Snyder et al. |
| 5,460,722 A | 10/1995 | Chen |
| 5,522,987 A * | 6/1996 | Bresolin ............ 210/167.27 |
| 5,567,315 A | 10/1996 | Weidenmann et al. |
| 5,571,409 A | 11/1996 | Scarborough |
| 5,728,293 A | 3/1998 | Guoli et al. |
| D460,996 S | 7/2002 | Carley et al. |
| D462,739 S | 9/2002 | Carley et al. |
| D468,393 S | 1/2003 | Agresta et al. |
| 6,692,637 B2 | 2/2004 | Fox et al. |
| 6,706,176 B1 | 3/2004 | Goldman |
| D494,251 S | 8/2004 | Fox, Jr. et al. |
| 6,797,163 B2 | 9/2004 | Carley et al. |
| 6,866,773 B2 | 3/2005 | Margovsky et al. |
| 7,033,491 B2 | 4/2006 | Chang |
| 7,429,321 B2 | 9/2008 | Willinger |
| 2004/0238426 A9 | 12/2004 | Fox et al. |
| 2005/0284397 A1 | 12/2005 | Carley et al. |
| 2006/0000755 A1 | 1/2006 | Carley et al. |

FOREIGN PATENT DOCUMENTS

| | | |
|---|---|---|
| JP | 61-230786 A | 10/1986 |
| JP | 10-80611 A | 3/1998 |
| JP | 2006-149221 A | 6/2006 |

OTHER PUBLICATIONS

*Eclipse—The Filtration & Illumination System*, Owner's Manual, Eclipse$_1$, Eclipse$_2$, Eclipse$_3$, Marineland Aquarium Products, Mar. 2000.

\* cited by examiner

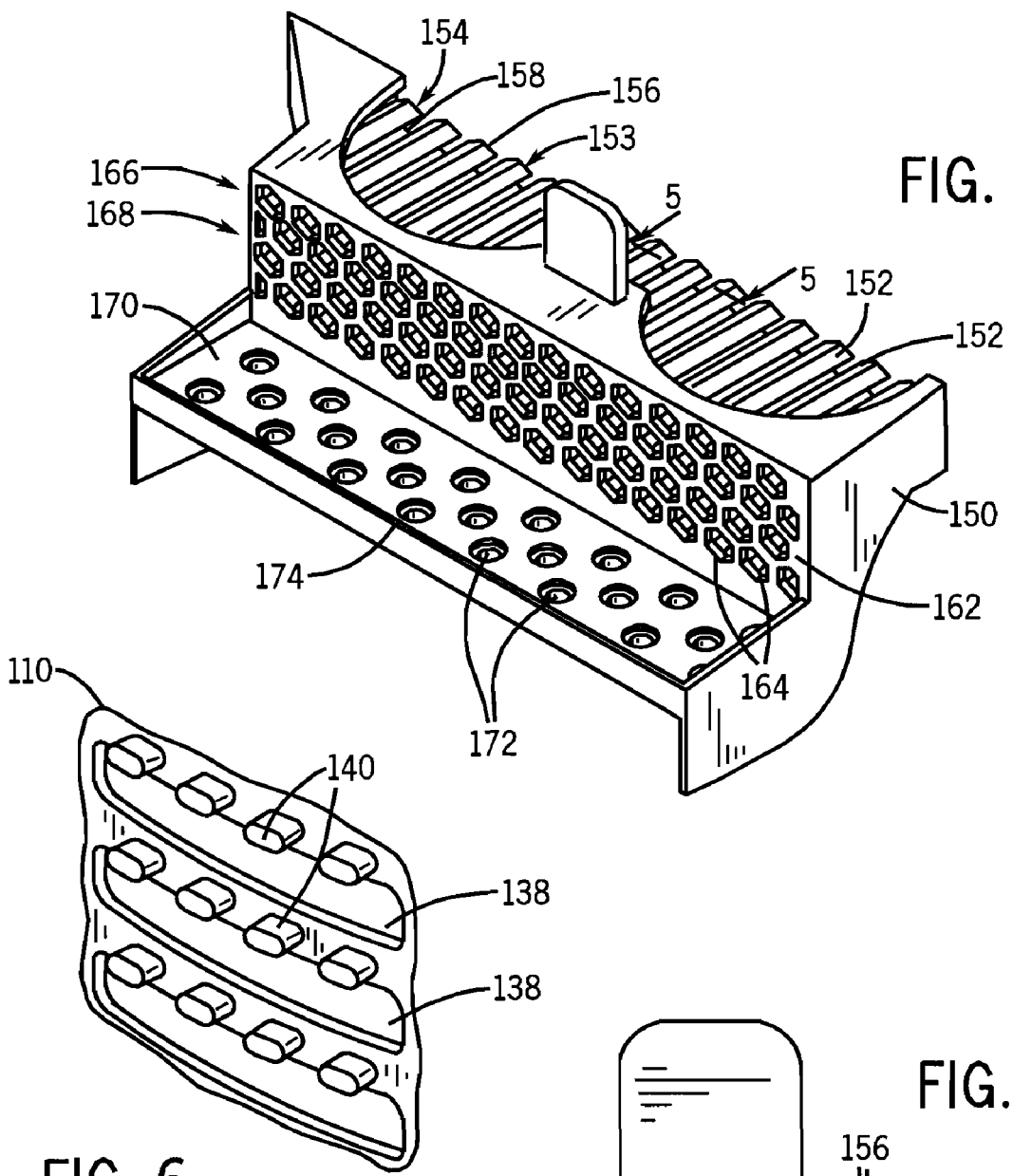

AQUARIUM FILTER

CROSS-REFERENCE TO RELATED APPLICATIONS

This application claims the benefit of and priority from Provisional U.S. Patent Application No. 60/791,830, filed Apr. 13, 2006. This application also claims the benefit of and priority from Italian Patent Application No. PD2006A000367, filed Oct. 5, 2006, and European Patent Application No. 07103798.0, filed Mar. 8, 2007.

BACKGROUND AND SUMMARY

The invention relates to aquarium filters and assemblies.

Aquarium filters and assemblies are known in the prior art. The present invention arose during continuing development efforts directed toward improved product construction, performance and features.

BRIEF DESCRIPTION OF THE DRAWINGS

FIG. 2A is an enlarged view of a portion of FIG. 2 at line 2A-2A.

FIG. 4 is an enlarged perspective view of a component of FIG. 3.

FIG. 5 is a sectional view taken along line 5-5 of FIG. 4.

FIG. 6 is an enlarged view of a portion of FIG. 3 at line 6-6.

DETAILED DESCRIPTION

Figure 1:
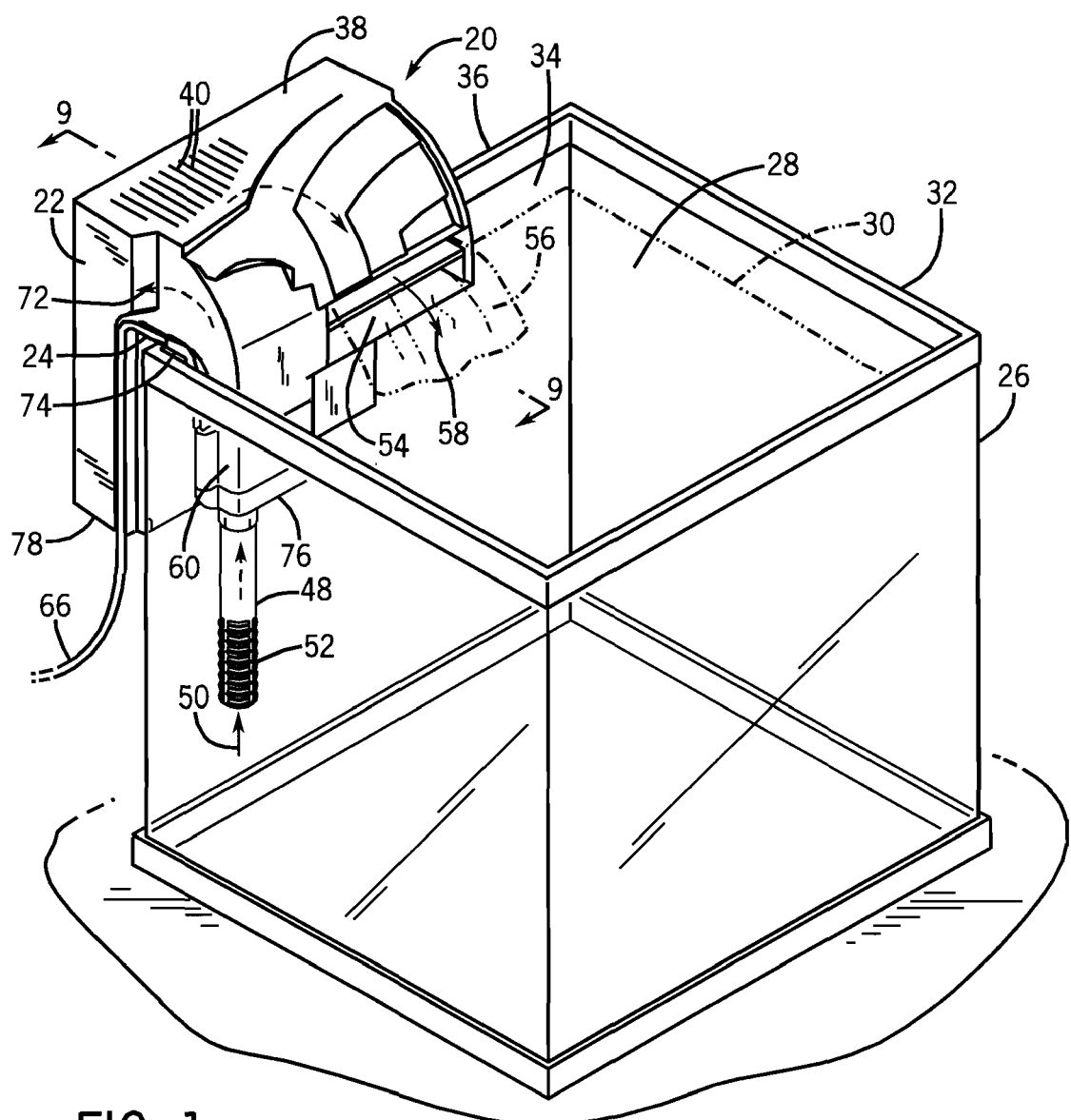
FIG. 1 is a perspective view of an aquarium filter assembly mounted to an aquarium tank.

FIG. 1 shows an aquarium filter assembly 20 including a housing 22 having mounting structure 24 for mounting to an aquarium tank 26. The tank has an interior 28 holding aquarium water therein as shown at water line 30, and has an exterior at 32. The tank has a sidewall 34 with a top 36. The housing has a removable top cover 38, FIG. 2, having vent openings or slits 40. A filter cartridge 42 is provided in the housing and has an upstream face 44, FIG. 3, and a downstream face 46. The housing has an inlet 48 receiving dirty aquarium water as shown at arrow 50 through inlet grate or screen 52, and has an outlet 54 returning clean filtered water to the tank, as shown at water flow 56 at arrow 58. The housing defines a water flow path therethrough from upstream to downstream from inlet 48 to outlet 54. A water pump 60 in the housing is at least partially submerged in the water in the tank and pumps water along the noted flow path by means of impeller 62 driven by electric motor 64 connected to a source of electrical power by power cord 66 to pump water from pumping chamber 68 upwardly through channel 70 as shown at arrow 72 in FIGS. 7, 9, to pump the water along the noted flow path through the housing. Housing 22 is an inverted U-shaped saddle having an upper bight 74, FIGS. 1-3, 9 at the top 36 of sidewall 34 of the tank, and having inner and outer legs 76 and 78, respectively, depending downwardly from bight 74. Inner leg 76 extends into the interior 28 of tank 26. Outer leg 78 extends along the exterior 32 of tank 26. Filter cartridge 42 is in outer leg 78. Water pump 60 is in inner leg 76. Motor 60 is detachable from the housing at living hinge spring clip 61.

Housing 22 has a filter chamber 80, FIGS. 2, 3, 7, 9, receiving filter cartridge 42 therein. The filter cartridge divides filter chamber 80 into a filter inlet plenum 82 receiving water from inlet 48, and a filter outlet plenum 84 delivering water to outlet 54. Upstream face 44 of the filter cartridge faces filter inlet plenum 82. Downstream face 46 of the filter cartridge faces filter outlet plenum 84. Housing 22 has a supply plenum 86 receiving water from water pump 60 through channel 70 and passage 71, and supplying the water to filter inlet plenum 82. Supply plenum 86 has an overflow bypass passage 88, FIGS. 7, 9, 10, supplying water from supply plenum 86 to filter outlet plenum 84 and bypassing filter cartridge 42 in response to clogging of the filter cartridge causing a given rise in water level in housing 22. Supply plenum 86 spans inner and outer legs 76 and 78. Housing 22 has a return plenum 90, FIGS. 7, 9, 10, spanning inner and outer legs 74 and 78 and crossing over the noted top 36 of sidewall 34 of aquarium tank 26 and returning water from filter outlet plenum 84 to outlet 54. Water from overflow bypass passage 88 from supply plenum 86 joins with water in filter outlet plenum 84 and return plenum 90 downstream of downstream face 46 of the filter cartridge. Supply plenum 86 has a cross-over portion 92, FIGS. 3, 7, directly above the top 36 of sidewall 34 of tank 26. Return plenum 90 has a cross-over portion 94 directly above the top 36 of sidewall 34 of tank 26. Cross-over portion 94 has a lower wall 96, FIGS. 3, 7, 9, 10, therealong. Cross-over portion 94 is laterally adjacent cross-over portion 92, and there is a plenum sidewall 98 therebetween. Plenum sidewall 98 extends from lower wall 96 of cross-over portion 94 upwardly to overflow bypass passage 88 at the top of sidewall 98.

Filter chamber 80 and filter cartridge 42 have respective first and second coacting keyed detents 102 and 104, FIGS. 2, 2A, 3, 8, 9, mating with each other to at least one of: a) orient and permit mounting of filter cartridge 42 in filter chamber 80 only with face 44 facing filter inlet plenum 82, and face 46 facing filter outlet plenum 84; and b) permitting mounting of only an authorized filter cartridge in filter chamber 80, namely a filter cartridge having a coacting keyed detent to mate with coacting keyed detent 102 of filter chamber 80. In one embodiment, filter cartridge 42 includes a replaceable filter element 106, FIG. 3, having the noted second detent 104. First and second detents 102 and 104 are aligned with each other and non-symmetrically disposed in offset relation in filter chamber 80. In one preferred form, first detent 102 is provided by a standing rib extending from housing 22 into filter chamber 80, and second detent 104 is provided by an aligned slot in the filter element receiving standing rib 102 in inserted relation. In another embodiment, the filter element has an auxiliary detent, as shown in dashed line at 108 in FIG. 3, spaced from detent 104 and, upon 180° reversal of orientation of filter element 106, coacting and mating with detent 102 to permit orientation and mounting of filter element 106 in filter chamber 80 in an alternate reversed orientation position with face 44 facing filter outlet plenum 84 rather than filter inlet plenum 82, to permit reversal of orientation of filter element 106 as desired. The orientation of filter element 106 is reversed by removing it from holster 110, to be described, and rotating filter element 106 180° about a vertical axis. If filter element 106 is reversible and can desirably or equivalently filter water flow in either direction, then the inclusion of both detents or slots 104 and 108 is preferred, to enable filter element 106 to be mounted in either of 180° opposite orientations. If filter element 106 has a preferred orientation, for example a differential gradient density filter where it is preferred that face 44 be facing upstream, then only a single detent or slot 104 is preferred, and detent or slot 108 is eliminated, such that filter element 106 can only be mounted and oriented in a single orientation position, namely with face 44 facing upstream toward filter inlet plenum 82. In the two slot version: detents 102 and 104 are aligned with each other and non-symmetrically disposed in offset relation in filter chamber 80 when face 44 faces filter inlet plenum 82; and detents 102 and 108 are aligned with each other and non-symmetrically disposed in offset relation in filter chamber 80 when face 44 faces filter outlet plenum 84, upon reversal of filter element 106. In one embodiment, as noted, detent 102 is provided by a standing rib extending from housing 22 into filter chamber 80, detent 104 is provided by a first slot in filter element 106 aligned with and receiving standing rib 102 in inserted relation when face 44 faces filter inlet plenum 82, and auxiliary detent 108 is provided by a second slot in the filter element aligned with and receiving standing rib 102 in inserted relation when face 44 faces filter outlet plenum 84.

Figure 2:
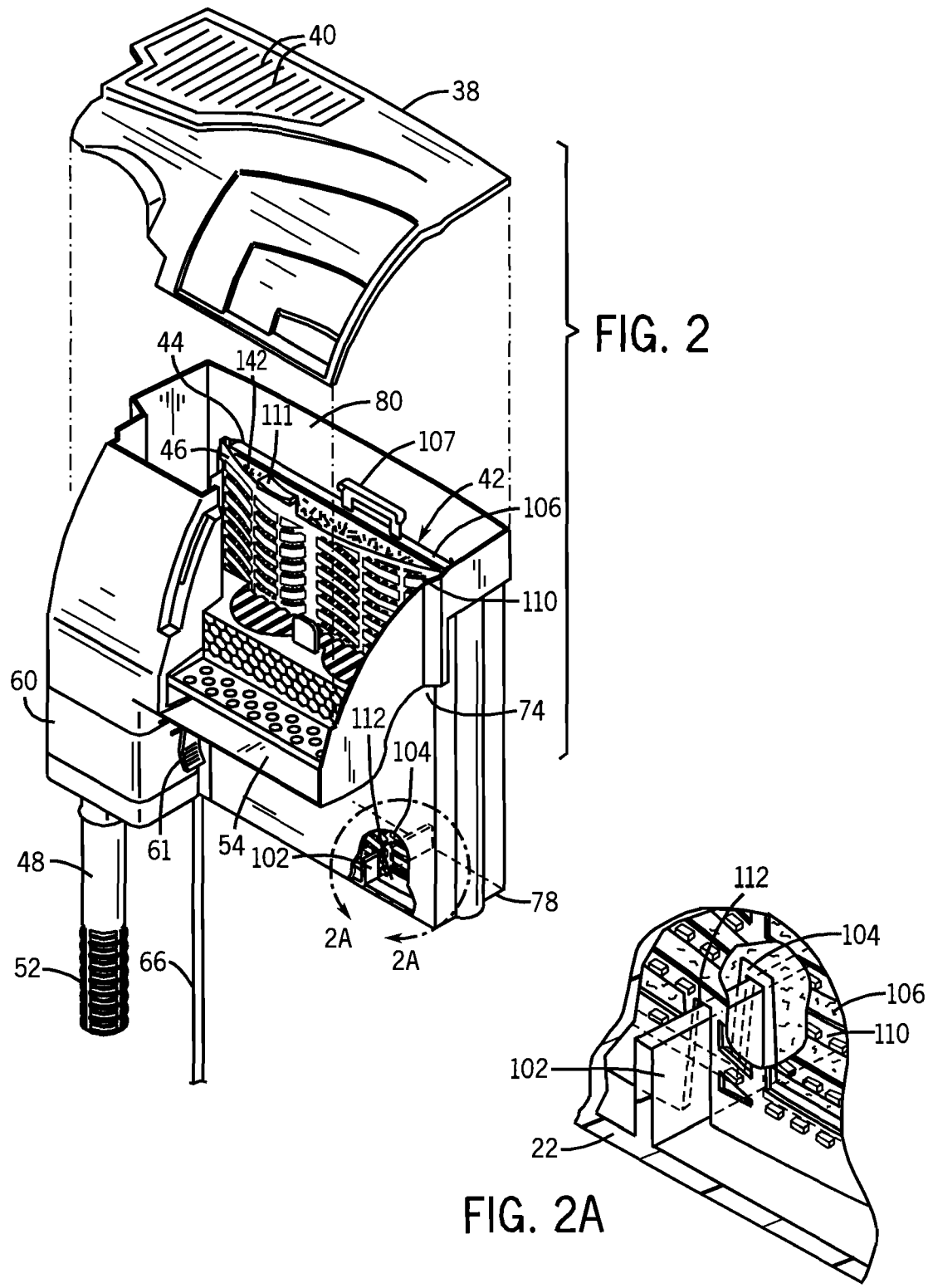
FIG. 2 is a perspective view of the aquarium filter assembly of FIG. 1, partially cut-away and with cover removed.
Figure 3:
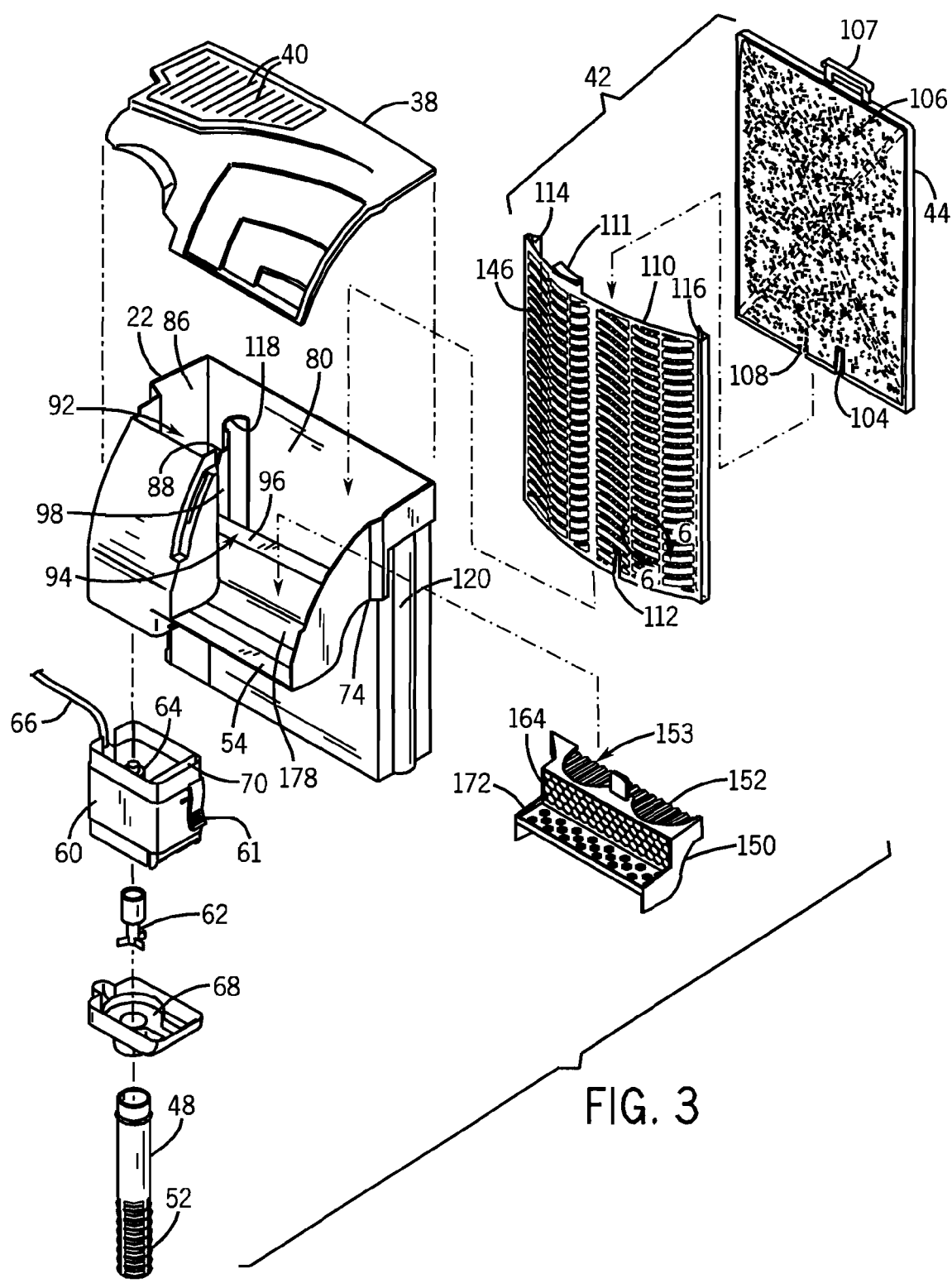
FIG. 3 is an exploded perspective view of the aquarium filter assembly of FIG. 2.

In one embodiment, filter cartridge 42 includes the noted replaceable filter element 106 and may additionally include a holster 110, FIGS. 2, 3. Replaceable filter element 106 is removably supported in holster 110 and is slidable downwardly thereinto. Filter element 106 and holster 110 have respective grip tabs 107 and 111. The holster has a detent 112 aligned with detent 104 and coacting with and mating with detent 102. Detents 102, 104, 112 are aligned with each other and non-symmetrically disposed in offset relation in filter chamber 80. In one embodiment, detent 102 is provided by the noted standing rib extending from housing 22 into filter chamber 80, and detents 104 and 112 are provided by aligned slots receiving standing rib 102 in inserted relation. Auxiliary detent 108 of filter element 106 is spaced from detent 104 and, upon 180° reversal of filter element 106, detent 108 coacts and mates with detent 102 and is aligned with detent 112 to permit orientation and mounting of filter element 106 in holster 110 in filter chamber 80 with face 44 facing filter outlet plenum 84, to permit reversal of orientation of filter element 106 as desired. As above, if filter element 106 has a preferred orientation, then slot 108 is eliminated, which in turn permits orientation and mounting of filter element 106 in the filter chamber 80 only with face 44 facing filter inlet plenum 82. If optional dual alternate orientation is desired, then slot 108 is provided, and: detents 102, 104, 112 are aligned with each other and non-symmetrically disposed in offset relation in filter chamber 80 when face 44 faces filter inlet plenum 82; and detents 102, 108, 112 are aligned with each other and non-symmetrically disposed in offset relation in filter chamber 80 when face 44 faces filter outlet plenum 84.

Filter element 106 and holster 110 engage each other in sliding relation along distally opposite guide tracks 114 and 116, FIG. 3, enabling removal of filter element 106 from holster 110. Holster 110 and filter chamber 80 engage each other in sliding relation along distally opposite guide tracks 118 and 120, FIGS. 3, 7, 10, enabling removal of holster 110 from filter chamber 80. Guide tracks 114 and 118 are adjacent and parallel to each other. Guide tracks 116 and 120 are adjacent and parallel to each other.

Figure 7:
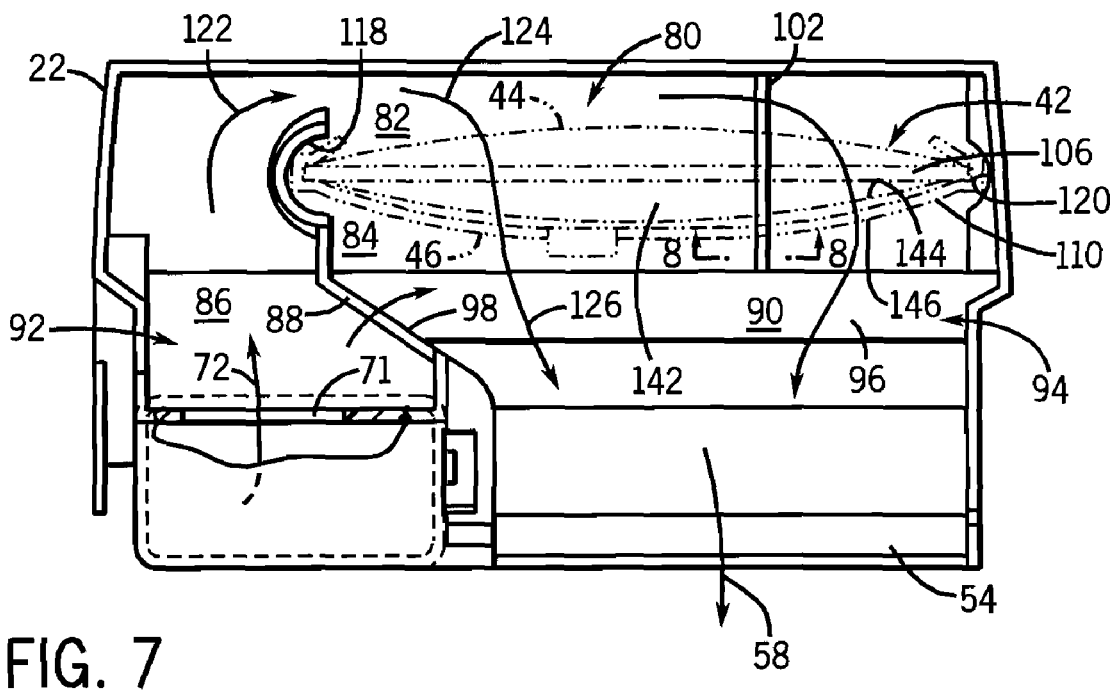
FIG. 7 is a top view of a component of FIG. 3.
Figure 8:
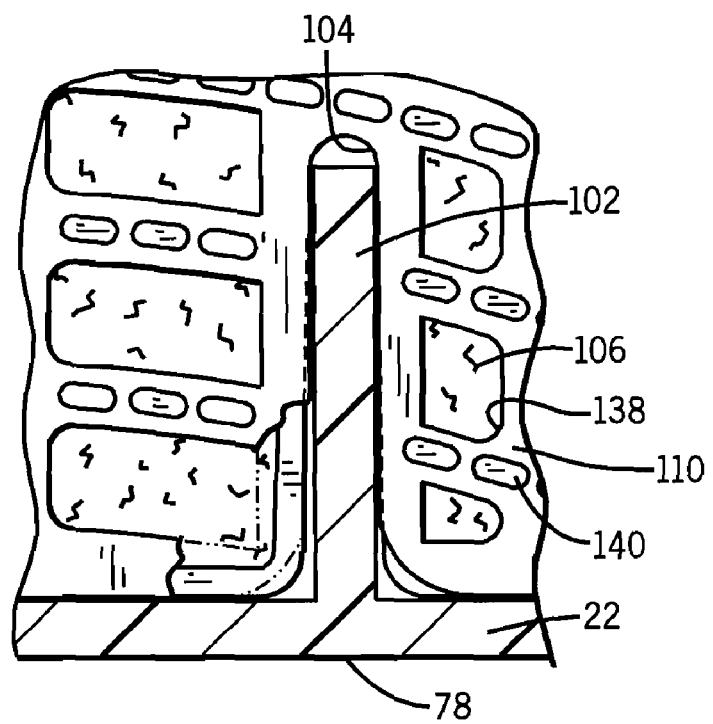
FIG. 8 is a sectional view taken along line 8-8 of FIG. 7.
Figure 9:
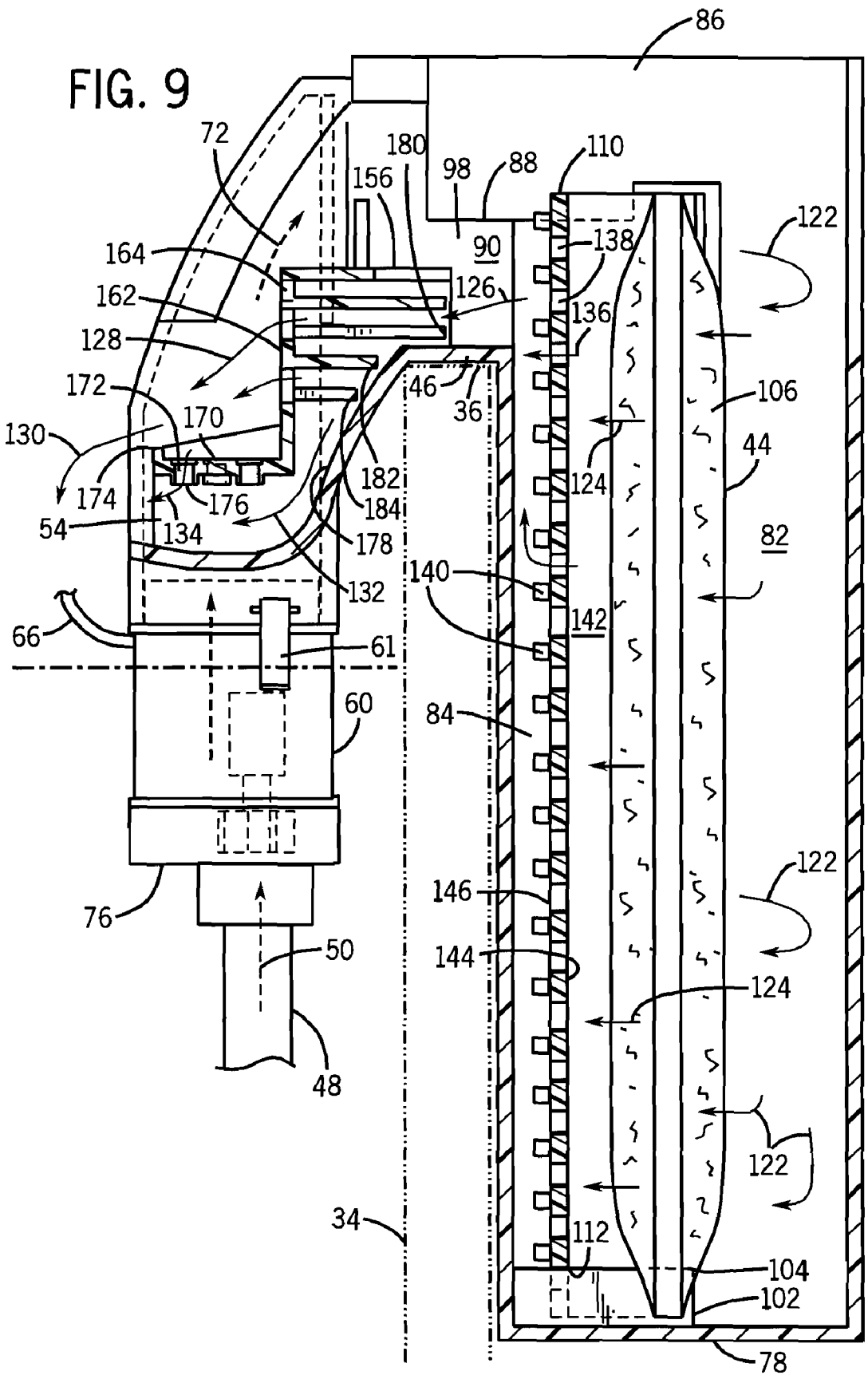
FIG. 9 is a sectional view taken along line 9-9 of FIG. 1.
Figure 10:
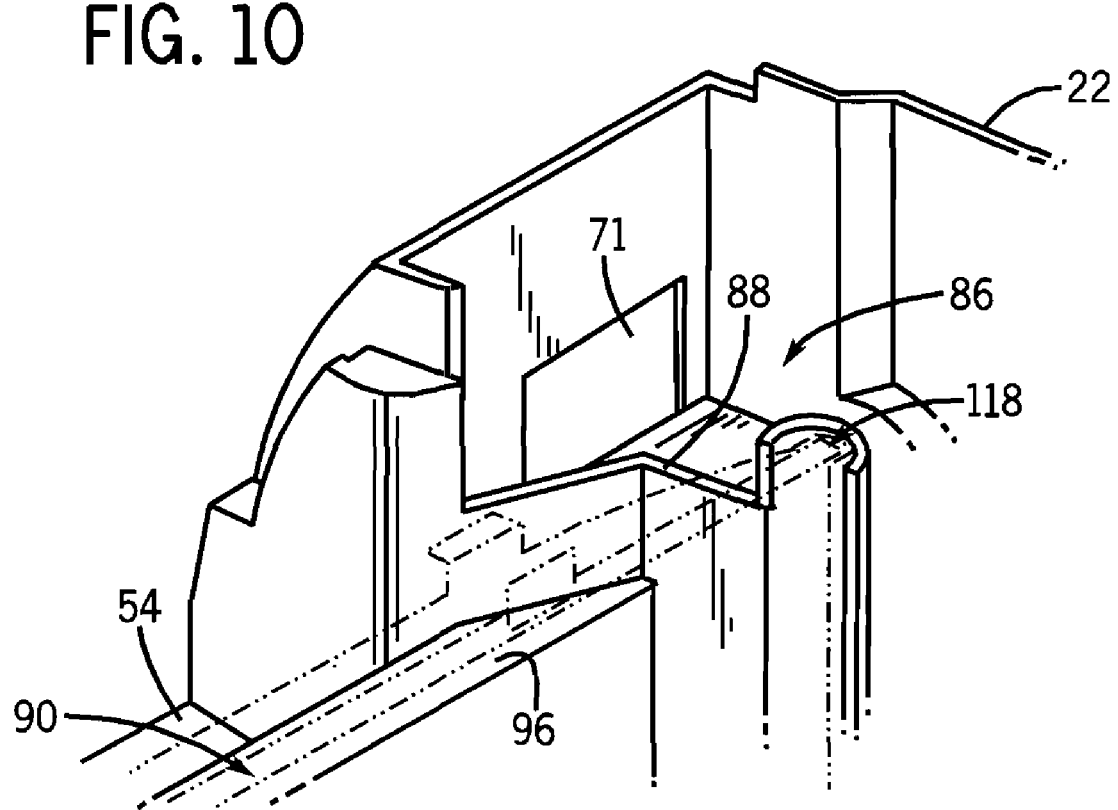
FIG. 10 is an enlarged perspective view of a component of FIG. 3 from a different angle.

Housing 22 defines a water flow path therethrough from upstream to downstream from inlet 48 to outlet 54 as shown at arrows 50, 72, 122, 124, 126, 128, 130, 132, 134, 58, including a flow path portion 136, FIGS. 7, 9, through the filter cartridge. Holster 110 has a plurality of water flow openings 138 therethrough, FIGS. 6, 8, providing water flow along flow path portion 136. The holster has a plurality of biological reactant surface area protrusions 140 extending therefrom along flow path portion 136 adjacent water flow openings 138. It is known in the prior art to provide biological filtration in aquariums by means of surfaces collecting beneficial bacteria to eliminate toxic ammonia and nitrites, in addition to the mechanical filtration provided by filter element 106, and in addition to chemical filtration which may be provided by filter element 106 additionally containing activated carbon to remove toxic impurities, odors, and discoloration. Filter element 106 and holster 110 have an intermediate plenum 142 therebetween, FIGS. 2, 7, 9. Intermediate plenum 142 is downstream of filter inlet plenum 82, and is upstream of filter outlet plenum 84. Holster 110 has a first face 144 facing intermediate plenum 142, and has a second face 146 facing oppositely from first face 144. Biological reactant surface area protrusions 140 extend from one of such faces, preferably face 146. Holster 110 is preferably downstream of filter element 106, and face 146 of the holster faces filter outlet plenum 84, and biological reactant surface area protrusions 140 extend from face 146 into filter outlet plenum 84.

In a further embodiment, the filter assembly housing outlet 54 has a removable insert 150, FIGS. 3, 4, having a plurality of biological reactant surface area protrusions 152 along flow path portion 126, 128 through outlet 54. Biological reactant surface area protrusions 152 are provided by a plurality of canopies 153, namely a first row 154 of a plurality of canopies 156, and a second row 158, FIG. 5, of a plurality of canopies 160 spaced below and offset from first row 154, and third and so on rows, such that water falls in cascade manner along the canopies, as shown at arrows 161 in FIG. 5. The insert 150 has a vertical wall 162 having a plurality of transfer openings 164 therethrough, including a first row 166 of transfer openings 167 from which first row 154 of canopies 156 extend horizontally as cantilevers, FIGS. 4, 9, and a second row 168 of transfer openings 169 from which the second row 158 of canopies 160 extend horizontally as cantilevers, and so on. In FIG. 5, canopies 153 extend out of the page toward the viewer. Insert 150 includes a horizontal wall 170 on the opposite side of vertical wall 162 from canopies 153 and below transfer openings 164 such that water flow along the noted outlet flow path portion through outlet 54 cascades along the canopies as shown at arrows 161 in FIG. 5, and then some of the water flows through transfer openings 164 as shown at arrow 128 in FIG. 9 and then flows along horizontal wall 170. The water flow thus steps down in staircase manner from canopies 153 to transfer openings 164 to horizontal wall 170. Horizontal wall 170 has a plurality of discharge openings 172 therein discharging water therethrough back to tank 26. Water which does not flow through discharge openings 172 will spill over the overflow edge lip 174 of wall 170. A plurality of short tubular extensions 176 extend downwardly from horizontal wall 170 from respective discharge openings 172 and provide additional biological reactant surface area protrusions along the inner walls thereof. The water flow cascading at 161 along canopies 153 which does not flow through transfer openings 164 flows downwardly as shown at 132 in FIG. 9 along sloped housing surface 178, and is discharged at outlet 54 beneath horizontal wall 170 of insert 150. In normal operation, the primary flow path is along sloped housing surface 178 as shown at arrow 132, and the water flow path at 128, 130, 134 through the water polisher 150 is an auxiliary flow path. Removable insert 150 has the noted canopies 153, vertical wall 162, and horizontal wall 170. Insert 150 provides a water polisher grid further filtering and charging and aerating the water with extra oxygen creating additional biological filtration, and also providing a quiet water return. The lower rows of canopies are of differing horizontal cantilever length, for example as shown at 180, 182, 184, FIG. 9, to accommodate sloped housing surface 178.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An aquarium filter assembly comprising a housing having mounting structure for mounting to an aquarium tank, said tank having an interior holding aquarium water therein, and an exterior, said tank having a sidewall with a top, a filter cartridge in said housing, said filter cartridge having an upstream face and a downstream face, said housing having an inlet receiving dirty aquarium water, and an outlet returning clean filtered water to said tank, said housing defining a flow path therethrough from upstream to downstream from said inlet to said outlet, a water pump in said housing pumping water along said flow path, said housing being an inverted U-shaped saddle having an upper bight at said toy of said sidewall of said tank, and having inner and outer legs depending downwardly from said bight, said inner leg extending into said interior of said tank, said outer leg extending along said exterior of said tank, said filter cartridge being in said outer leg, said water pump being contained in said inner leg, said inner leg further comprising an interior channel wherein said water pump is configured for pumping water upwardly through said interior channel of said inner leg and into said outer leg, wherein said housing has a filter chamber receiving said filter cartridge therein, said filter cartridge dividing said filter chamber into a filter inlet plenum receiving water from said inlet, and a filter outlet plenum delivering water to said outlet, said upstream face of said filter cartridge facing said inlet plenum, said downstream face of said filter cartridge facing said filter outlet plenum, said housing having a supply plenum supplying water to said filter inlet plenum from said water pump, said supply plenum having an overflow bypass passage supplying water from said supply plenum to said filter outlet plenum and bypassing said filter cartridge in response to clogging of said filter cartridge causing a given rise of water level in said housing.

2. The aquarium filter assembly according to claim 1 wherein said supply plenum spans said inner and outer legs, and said housing has a return plenum spanning said inner and outer legs and crossing over said top of said sidewall of said tank and returning water from said filter outlet plenum to said outlet, and wherein water from said overflow bypass passage from said supply plenum joins with water in said return plenum downstream of said downstream face of said filter cartridge.

3. The aquarium filter assembly according to claim 2 wherein said supply plenum has a first cross-over portion directly above said top of said sidewall of said tank, said return plenum has a second cross-over portion directly above said top of said sidewall of said tank, said second cross-over portion has a lower wall guiding water flow therealong, said second cross-over portion is laterally adjacent first cross-over portion and has a plenum sidewall therebetween, said plenum sidewall extending from said lower wall of said second cross-over portion upwardly to said overflow bypass passage.

4. An aquarium filter assembly comprising a housing having mounting structure for mounting to an aquarium tank, said tank having an interior holding aquarium water therein, and an exterior, said tank having a sidewall with a top, a filter cartridge in said housing, said filter cartridge having an upstream face and a downstream face, said housing having an inlet receiving dirty aquarium water, and an outlet returning clean filtered water to said tank, said housing defining a flow path therethrough from upstream to downstream from said inlet to said outlet, a water pump in said housing pumping water along said flow path, said housing being an inverted U-shaped saddle having an upper bight at said top of said sidewall of said tank, and having inner and outer legs depending downwardly from said bight, said inner leg extending into said interior of said tank, said outer leg extending along said exterior of said tank, said filter cartridge being in said outer leg, said water pump being contained in said inner leg, said inner leg further comprising an interior channel wherein said water pump is configured for pumping water upwardly through said interior channel of said inner leg and into said outer leg, wherein said water pump is downwardly detachable from said inner leg.

5. An aquarium filter assembly comprising a housing having mounting structure for mounting to an aquarium tank, said tank having an interior holding aquarium water therein, and an exterior, said tank having a sidewall with a top, a filter cartridge in said housing, said filter cartridge having an upstream face and a downstream face, said housing having an inlet receiving dirty aquarium water, and an outlet returning clean filtered water to said tank, said housing defining a flow path therethrough from upstream to downstream from said inlet to said outlet, a water pump in said housing pumping water along said flow path, said housing being an inverted U-shaped saddle having an upper bight at said top of said sidewall of said tank, and having inner and outer legs depending downwardly from said bight, said inner leg extending into said interior of said tank, said outer leg extending along said exterior of said tank, said filter cartridge being in said outer leg, said water pump being contained in said inner leg, said inner leg further comprising an interior channel wherein said water pump is configured for pumping water upwardly through said interior channel of said inner leg and into said outer leg, wherein said water pump is downwardly detachable from said inner leg via a living hinge spring clip.

6. An aquarium filter assembly comprising a housing having mounting structure for mounting to an aquarium tank, said tank having an interior holding aquarium water therein, and an exterior, said tank having a sidewall with a top, a filter cartridge in said housing, said filter cartridge having an upstream face and a downstream face, said housing having an inlet receiving dirty aquarium water, and an outlet returning clean filtered water to said tank, said housing defining a flow path therethrough from upstream to downstream from said inlet to said outlet, a water pump in said housing pumping water along said flow path, said housing being an inverted U-shaped saddle having an upper bight at said top of said sidewall of said tank, and having inner and outer legs depending downwardly from said bight, said inner leg extending into said interior of said tank and configured for extending below water line, said outer leg extending along said exterior of said tank, said filter cartridge being in said outer leg, said water pump being contained in said inner leg, said inner leg further comprising an interior channel wherein said water pump is configured for pumping water upwardly through said interior channel of said inner leg and into said outer leg, wherein said housing has a filter chamber receiving said filter cartridge therein, said filter cartridge dividing said filter chamber into a filter inlet plenum receiving water from said inlet, and a filter outlet plenum delivering water to said outlet, said upstream face of said filter cartridge facing said inlet plenum, said downstream face of said filter cartridge facing said filter outlet plenum, said housing having a supply plenum supplying water to said filter inlet plenum from said water pump, said supply plenum having an overflow bypass passage supplying water from said supply plenum to said filter outlet plenum and bypassing said filter cartridge in response to clogging of said filter cartridge causing a given rise of water level in said housing.

7. The aquarium filter assembly according to claim 6 wherein said supply plenum spans said inner and outer legs, and said housing has a return plenum spanning said inner and outer legs and crossing over said top of said sidewall of said tank and returning water from said filter outlet plenum to said outlet, and wherein water from said overflow bypass passage from said supply plenum joins with water in said return plenum downstream of said downstream face of said filter cartridge.

8. The aquarium filter assembly according to claim 7 wherein said supply plenum has a first cross-over portion directly above said top of said sidewall of said tank, said return plenum has a second cross-over portion directly above said top of said sidewall of said tank, said second cross-over portion has a lower wall guiding water flow therealong, said second cross-over portion is laterally adjacent first cross-over portion and has a plenum sidewall therebetween, said plenum sidewall extending from said lower wall of said second cross-over portion upwardly to said overflow bypass passage.

9. An aquarium filter assembly comprising a housing having mounting structure for mounting to an aquarium tank, said tank having an interior holding aquarium water therein, and an exterior, said tank having a sidewall with a top, a filter cartridge in said housing, said filter cartridge having an upstream face and a downstream face, said housing having an inlet receiving dirty aquarium water, and an outlet returning clean filtered water to said tank, said housing defining a flow path therethrough from upstream to downstream from said inlet to said outlet, a water pump in said housing pumping water along said flow path, said housing being an inverted U-shaped saddle having an upper bight at said top of said sidewall of said tank, and having inner and outer legs depending downwardly from said bight, said inner leg extending into said interior of said tank and configured for extending below water line, said outer leg extending along said exterior of said tank, said filter cartridge being in said outer leg, said water pump being contained in said inner leg, said inner leg further comprising an interior channel wherein said water pump is configured for pumping water upwardly through said interior channel of said inner leg and into said outer leg, wherein said water pump is downwardly detachable from said inner leg.

10. An aquarium filter assembly comprising a housing having mounting structure for mounting to an aquarium tank, said tank having an interior holding aquarium water therein, and an exterior, said tank having a sidewall with a top, a filter cartridge in said housing, said filter cartridge having an upstream face and a downstream face, said housing having an inlet receiving dirty aquarium water, and an outlet returning clean filtered water to said tank, said housing defining a flow path therethrough from upstream to downstream from said inlet to said outlet, a water rump in said housing pumping water along said flow path, said housing being an inverted U-shaped saddle having an upper bight at said top of said sidewall of said tank, and having inner and outer legs depending downwardly from said bight, said inner leg extending into said interior of said tank and configured for extending below water line, said outer leg extending along said exterior of said tank, said filter cartridge being in said outer leg, said water pump being contained in said inner leg, said inner leg further comprising an interior channel wherein said water pump is configured for pumping water upwardly through said interior channel of said inner leg and into said outer leg, wherein said water pump is downwardly detachable from said inner leg via a living hinge spring clip.

11. An aquarium filter assembly comprising a housing having mounting structure for mounting to an aquarium tank, said tank having an interior holding aquarium water therein, and an exterior, said tank having a sidewall with a top, a filter cartridge in said housing, said filter cartridge having an upstream face and a downstream face, said housing having an inlet receiving dirty aquarium water, and an outlet returning clean filtered water to said tank, said housing defining a flow path therethrough from upstream to downstream from said inlet to said outlet, a water pump in said housing pumping water along said flow path, said housing being an inverted U-shaped saddle having an upper bight at said top of said sidewall of said tank, and having inner and outer legs depending downwardly from said bight, said inner leg extending into said interior of said tank said outer leg extending along said exterior of said tank, said filter cartridge being in said outer leg, said water pump being contained in said inner leg, and said water pump being downwardly detachable from said inner leg.

12. The aquarium filter assembly according to claim 11 wherein said housing has a filter chamber receiving said filter cartridge therein, said filter cartridge dividing said filter chamber into a filter inlet plenum receiving water from said inlet, and a filter outlet plenum delivering water to said outlet, said upstream face of said filter cartridge facing said inlet plenum, said downstream face of said filter cartridge facing said filter outlet plenum, said housing having a supply plenum supplying water to said filter inlet plenum from said water pump, said supply plenum having an overflow bypass passage supplying water from said supply plenum to said filter outlet plenum and bypassing said filter cartridge in response to clogging of said filter cartridge causing a given rise of water level in said housing.

13. The aquarium filter assembly according to claim 12 wherein said supply plenum spans said inner and outer legs, and said housing has a return plenum spanning said inner and outer legs and crossing over said top of said sidewall of said tank and returning water from said filter outlet plenum to said outlet, and wherein water from said overflow bypass passage from said supply plenum joins with water in said return plenum downstream of said downstream face of said filter cartridge.

14. The aquarium filter assembly according to claim 13 wherein said supply plenum has a first cross-over portion directly above said top of said sidewall of said tank, said return plenum has a second cross-over portion directly above said top of said sidewall of said tank, said second cross-over portion has a lower wall guiding water flow therealong, said second cross-over portion is laterally adjacent first cross-over portion and has a plenum sidewall therebetween, said plenum sidewall extending from said lower wall of said second cross-over portion upwardly to said overflow bypass passage.

15. The aquarium filter assembly according to claim 11, wherein said water pump is downwardly detachable from said inner leg via a living hinge spring clip.

16. The aquarium filter assembly according to claim 11, further comprising a removable top cover.

* * * * *

UNITED STATES PATENT AND TRADEMARK OFFICE
CERTIFICATE OF CORRECTION

PATENT NO. : 7,618,534 B2  Page 1 of 1
APPLICATION NO. : 11/696767
DATED : November 17, 2009
INVENTOR(S) : Brad L. Mihlbauer et al.

It is certified that error appears in the above-identified patent and that said Letters Patent is hereby corrected as shown below:

Claim 1, page 5, line 27: replace "toy" with "top"

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,618,534 B2  Page 1 of 1
APPLICATION NO. : 11/696767
DATED : November 17, 2009
INVENTOR(S) : Brad L. Mihlbauer et al.

It is certified that error appears in the above-identified patent and that said Letters Patent is hereby corrected as shown below:

Claim 1, Column 5, line 27: replace "toy" with "top"

This certificate supersedes the Certificate of Correction issued August 10, 2010.

Signed and Sealed this

Thirty-first Day of August, 2010

David J. Kappos
*Director of the United States Patent and Trademark Office*